(12) United States Patent
Kitagawa

(10) Patent No.: US 10,536,640 B2
(45) Date of Patent: Jan. 14, 2020

(54) IMAGING DEVICE, OPERATION METHOD, IMAGE PROCESSING DEVICE, AND IMAGE PROCESSING METHOD

(71) Applicant: FUJIFILM CORPORATION, Minato-ku, Tokyo (JP)

(72) Inventor: Junya Kitagawa, Saitama (JP)

(73) Assignee: FUJIFILM CORPORATION, Tokyo (JP)

( * ) Notice: Subject to any disclaimer, the term of this patent is extended or adjusted under 35 U.S.C. 154(b) by 0 days.

(21) Appl. No.: 16/127,245

(22) Filed: Sep. 11, 2018

(65) Prior Publication Data

US 2019/0007617 A1 Jan. 3, 2019

Related U.S. Application Data

(63) Continuation of application No. PCT/JP2017/011820, filed on Mar. 23, 2017.

(30) Foreign Application Priority Data

Mar. 30, 2016 (JP) ................................. 2016-069139

(51) Int. Cl.
*H04N 5/232* (2006.01)
*G06T 7/70* (2017.01)
(Continued)

(52) U.S. Cl.
CPC ..... *H04N 5/23264* (2013.01); *G02B 27/0025* (2013.01); *G06T 7/70* (2017.01); *H04N 5/2254* (2013.01)

(58) Field of Classification Search
CPC ............. H04N 5/23264; H04N 5/2254; H04N 5/23258; H04N 5/23287; H04N 5/232;
(Continued)

(56) References Cited

U.S. PATENT DOCUMENTS

2005/0057662 A1 3/2005 Washisu

FOREIGN PATENT DOCUMENTS

JP H09-139881 A 5/1997
JP 2001-154226 A 6/2001
(Continued)

OTHER PUBLICATIONS

International Search Report issued in International Application No. PCT/JP2017/011820 dated Aug. 1, 2017.
(Continued)

*Primary Examiner* — Twyler L Haskins
*Assistant Examiner* — Angel L Garces-Rivera
(74) *Attorney, Agent, or Firm* — Solaris Intellectual Property Group, PLLC

(57) ABSTRACT

The imaging device includes an imaging optical system, imaging unit having an imaging element and for capturing a video by imaging a subject image through the imaging optical system, a camera shake detection unit configured to detect camera shake, an optical correction unit configured to optically correct the camera shake detected by the camera shake detection unit by changing a position of the imaging optical system or the imaging element in a case where the optical correction unit is turned on and to stop the correction in a case where the optical correction unit is turned off, and a reset determination unit for determining whether or not to reset the position of the imaging optical system or the imaging element. The optical correction unit resets the position of the imaging optical system or the imaging element in a case where the reset determination unit determines to reset the position of the imaging optical system or the imaging element. The imaging device further includes an electronic correction unit configured to electronically correct a change of a position of a subject, based on an operation of the reset by the optical correction unit, in an
(Continued)

image captured by the imaging unit in a case where the reset by the optical correction unit is started.

14 Claims, 9 Drawing Sheets

(51) Int. Cl.
*G02B 27/00* (2006.01)
*H04N 5/225* (2006.01)

(58) Field of Classification Search
CPC .... G06T 7/70; G02B 27/0025; G02B 27/646; G03B 2205/0007; G03B 5/00
See application file for complete search history.

(56) References Cited

FOREIGN PATENT DOCUMENTS

| JP | 2005-77886 A | 3/2005 |
| JP | 4518197 B2 | 8/2010 |
| JP | 4900939 B2 | 3/2012 |

OTHER PUBLICATIONS

Written Opinion of the ISA issued in International Application No. PCT/JP2017/011820 dated Aug. 1, 2017.

FIG. 5
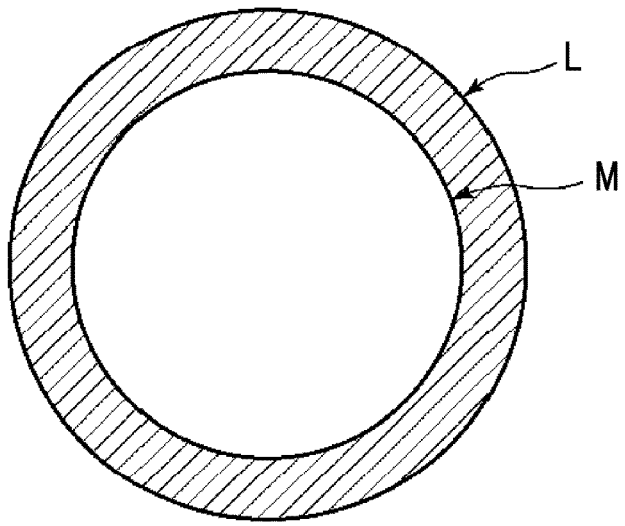
FIG. 6
ORIENTATION: DIRECTION IN WHICH
             CAMERA IS PANNED
ARROW COLOR: STATUS OF OPTICAL
             CORRECTION
BLACK ARROW: OPTICAL CORRECTION
             IS TURNED ON
WHITE ARROW: OPTICAL CORRECTION IS
             TURNED OFF (RESET)
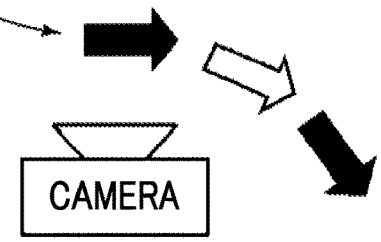
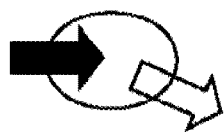 RATTLING SEEN AT THIS JOINT IS
DESIRED TO BE SUPPRESSED

IMAGING DEVICE, OPERATION METHOD, IMAGE PROCESSING DEVICE, AND IMAGE PROCESSING METHOD

CROSS-REFERENCE TO RELATED APPLICATIONS

This application is a continuation application of International Application No. PCT/JP2017/011820, filed Mar. 23, 2017, the disclosure of which is incorporated herein by reference in its entirety. Further, this application claims priority from Japanese Patent Application No. 2016-069139, filed Mar. 30, 2016, the disclosure of which is incorporated herein by reference in its entirety.

BACKGROUND

1. Technical Field

The present invention relates to an imaging device, an operation method, an image processing device, and an image processing method, and particularly, to an imaging device, an operation method, an image processing device, and an image processing method which are capable of relaxing shake of an image caused by a reset operation using optical correction means.

2. Related Art

In the related art, in an imaging device such as a digital camera, in a case where imaging is performed by hand, an optical axis of an imaging lens is moved relatively to a subject due to vibration caused in the imaging device, and shake of a subject image, that is, camera shake is caused on a captured image in some cases. In order to correct such camera shake, an imaging device having a camera shake correction function has been widely used. As the camera shake correction function, there are electronic correction means for correcting camera shake by performing image processing on the captured image data and optical correction means for correcting camera shake by moving at least a part of an imaging optical system, an image sensor, or the entire camera module in which the imaging optical system and the image sensor are integrally provided. In recent years, camera shake correction means obtained by combining the electronic correction means and the optical correction means has been suggested.

As the camera shake correction means obtained by combining the electronic correction means and the optical correction means, JP4900939B discloses that a portion uncorrected in the optical correction is additionally corrected through the electronic correction by sufficiently reducing a cutoff frequency of a high-pass filter in a case where a drive-means limit signal which is a signal indicating that the correction exceeds a correctable range of an optical correction system is detected. JP4518197B describes that the electronic correction is performed on a correction amount remaining after a limit amount of the optical image shake correction amount is subtracted from a total image shake correction amount in a case where an optical image shake correction amount reaches a limit.

SUMMARY

Meanwhile, as the optical correction means, there is means for returning the position of the optical correction system to a centering position, that is, performing a reset operation in a case where a position of the optical correction system reaches a limit of an optical correction range. FIG. 2 shows movement of the optical correction system and a change of an angle of view with the movement of the optical correction system during imaging in a state in which camera shake correction is performed. In FIG. 2, frames 1 to 3 are frames in the order in which the frames are captured, and a flow of a video is shown. A thick frame in each frame represents an angle of view F in which the imaging is performed in a state in which optical camera shake correction is performed, a circle L in the center of FIG. 2 represents an optical correction range of the optical correction system, that is, a correctable range, a trajectory within the circle L represents a trajectory of the camera shake, and a star in FIG. 2 represents a current position of the optical correction system.

As shown in FIG. 2, on a frame 1, since the position of the optical correction system falls within the optical correction range, an angle of view during the imaging is fixed by the thick frame. On a frame 2, since the position of the optical correction system also falls within the optical correction range, the angle of view is the same as that of the frame 1. However, on the frame 2, since the optical correction system is positioned at an edge of the optical correction range, it is determined that the camera shake correction reaches the limit of the optical correction range, and the reset operation using the optical correction system is started. That is, an operation for returning the optical correction system to the centering position is started.

In a case where the reset operation using the optical correction system is started, since the position of the optical correction system is rendered to be forcibly returned to the center, the optical correction system is moved in a direction which is not related to the camera shake, and thus, the angle of view is changed from the frame 2 as represented on a frame 3. The change of the position of the subject which is not intended by a user, that is, image shake is caused due to the change of the angle of view F on a video in some cases.

The present invention has been made in view of the aforementioned circumstances, and an object of the present invention is to provide an imaging device, an operation method, an image processing device, and an image processing method which are capable of relaxing shake of an image caused by a reset operation using optical correction unit.

An imaging device according to the present invention comprises an imaging optical system that includes one or more lens, an imaging unit having an imaging element, for capturing a video by imaging a subject image through the imaging optical system, a camera shake detection unit configured to detect camera shake, an optical correction unit configured to optically correct the camera shake detected by the camera shake detection unit in a case where the optical correction unit is turned on by changing a position of the imaging optical system or the imaging element, and to stop the correction in a case where the optical correction unit is turned off, and a reset determination unit configured to determine whether or not to reset the position of the imaging optical system or the imaging element. The optical correction unit resets the position of the imaging optical system or the imaging element in a case where the reset determination unit determines to reset the position of the imaging optical system or the imaging element, wherein the imaging device further comprises an electronic correction unit configured to electronically correct a change of a position of a subject based on an operation of the reset by the optical correction unit, in an image captured by the imaging unit in a case where the reset by the optical correction unit is started An operation method according to the present invention is an operation method of an imaging device which includes an imaging optical system that includes one or more lens, an imaging unit having an imaging element, for capturing a video by imaging a subject image through the imaging optical system, a camera shake detection unit configured to detect camera shake, an optical correction unit configured to optically correct the camera shake by changing a position of the imaging optical system or the imaging element, a reset determination unit configured to determine whether or not to reset the position of the imaging optical system or the imaging element, and an electronic correction unit configured to electronically correct a change of a position of a subject in an image captured by the imaging unit. The method comprising causing the camera shake detection unit to detect the camera shake and causing the optical correction unit to optically correct the detected camera shake in a case where the optical correction unit is turned on, causing the reset determination unit to determine whether or not to reset the position of the imaging optical system or the imaging element, and causing the optical correction unit to stop the correction and start the reset of the position of the imaging optical system or the imaging element and causing the electronic correction unit to electronically correct the change of the position of the subject, based on an operation of the reset by the optical correction unit in the image captured by the imaging unit in a case where the reset determination unit determines to reset the position of the imaging optical system or the imaging element.

In the present invention, the expression of "reset the position of the imaging optical system or the imaging element" means an operation for returning the position of the imaging optical system or the imaging element to a normal centering position, that is, a central position in a case where the optical correction unit is not turned on, and the expression of "the change of the position of the subject based on an operation of the reset by the optical correction unit in the image" means the shake of the image caused by the reset operation using the optical correction unit. For example, the case where the optical correction unit is turned on may occur in a case where a camera shake correction mode is turned on by the user, or may automatically occur in a case where the camera shake is detected by the camera shake detection unit. For example, the case where the optical correction unit is turned off may occur in a case where the camera shake correction mode is turned off by the user, or may occur in a case where a predetermined time elapses while the camera shake is not detected by the camera shake detection unit.

In the imaging device and the operation method according to the present invention, the electronic correction unit may perform correction for canceling the change of the position of the subject on the image based on the operation of the reset of the position of the imaging optical system or the imaging element during the operation of the reset by the optical correction unit.

In the present invention, the expression of "correction for canceling the change of the position of the subject" means correction for moving the subject in a direction opposite to a movement direction by an amount with which the subject is moved on the image by performing the reset operation using the optical correction unit, that is, the operation for returning the position of the imaging optical system or the imaging element to the centering position.

In the imaging device and the operation method according to the present invention, the electronic correction unit may perform correction for returning the canceled position of the subject to an original position in a case where the optical correction unit is turned on again.

In the present invention, the expression of "in a case where the optical correction unit is turned on again" means a case where the optical correction unit is turned on after the optical correction unit is turned off and the reset operation is performed, and the expression of "correction for returning the canceled position of the subject to an original position" means that the position of the subject is moved in an orientation opposite to the orientation in which the subject on the image corrected by the electronic correction unit is moved by a correction amount during the reset operation.

In the imaging device and the operation method according to the present invention, the reset determination unit may determine to reset the position of the imaging optical system or the imaging element in a case where the imaging optical system or the imaging element reaches a correction limit due to the correction by the optical correction unit.

Here, the expression of "reaches a correction limit" means a case where the position of the imaging optical system or the imaging element moved by the optical correction unit is positioned at an edge of the correctable range.

In the imaging device and the operation method according to the present invention, the reset determination unit may determine to reset the position of the imaging optical system or the imaging element in a case where the imaging optical system or the imaging element is positioned within an edge region of a correctable range by the optical correction unit for a predetermined set time or longer.

The expression of "within an edge region of a correctable range" means a side within a region within the correctable range close to a preset edge portion.

In the imaging device and the operation method according to the present invention, the reset determination unit may determine to reset the position of the imaging optical system or the imaging element in a case where panning is started in a state in which the optical correction unit is turned on.

In the present invention, the "panning" means a method of capturing the video while moving an orientation of the camera in a left-right direction or an upper-lower direction.

The imaging device according to the present invention may further comprise a shake detection unit configured to detect shake of an imaging device main body. The reset determination unit may determine to reset the position of the imaging optical system or the imaging element in a case where an integral value of a value detected by the shake detection unit exceeds a set threshold value.

The imaging device according to the present invention may further comprise a shake detection unit configured to detect shake of an imaging device main body. The reset determination unit may determine to reset the position of the imaging optical system or the imaging element in a case where a state in which a value detected by the shake detection unit is a value smaller than a set threshold value is continued for a predetermined set time.

In the operation method according to the present invention, the imaging device may further include a shake detection unit configured to detect shake of an imaging device main body, and the reset determination unit may determine to reset the position of the imaging optical system or the imaging element in a case where an integral value of a value detected by the shake detection unit exceeds a set threshold value.

In the operation method according to the present invention, the imaging device may further include a shake detection unit configured to detect shake of an imaging device main body, and the reset determination unit may determine to reset the position of the imaging optical system or the imaging element in a case where a state in which a value detected by the shake detection unit is a value smaller than a set threshold value is continued for a predetermined set time.

An image processing device according to the present invention comprises an input unit configured to input image data of a video captured in an imaging device and data indicating a timing when a reset by an optical correction unit is started, the imaging device including an imaging optical system that includes one or more lens, an imaging unit having an imaging element, for capturing a video by imaging a subject image through the imaging optical system, a camera shake detection unit configured to detect camera shake, the optical correction unit configured to optically correct the camera shake detected by the camera shake detection unit in a case where the optical correction unit is turned on by changing a position of the imaging optical system or the imaging element, and to stop the correction in a case where the optical correction unit is turned off, and a reset determination unit configured to determine whether or not to reset the position of the imaging optical system or the imaging element, the optical correction unit resetting the position of the imaging optical system or the imaging element in a case where the reset determination unit determines to reset the position of the imaging optical system or the imaging element, and an electronic correction unit configured to electronically correct a change of a position of a subject, based on an operation of the reset by the optical correction unit, in the image data in a case where the data indicating the timing when the reset by the optical correction unit is started indicates the start of the reset in the image data input by the input unit.

An image processing method according to the present invention comprises inputting image data of a video captured in an imaging device and data indicating a timing when a reset by an optical correction unit is started, the imaging device including an imaging optical system that includes one or more lens, an imaging unit having an imaging element, for capturing a video by imaging a subject image through the imaging optical system, a camera shake detection unit configured to detect camera shake, optical correction unit configured to optically correct the camera shake detected by the camera shake detection unit in a case where the optical correction unit is turned on by changing a position of the imaging optical system or the imaging element, and to stop the correction in a case where the optical correction unit is turned off, and a reset determination unit configured to determine whether or not to reset the position of the imaging optical system or the imaging element, the optical correction unit resetting the position of the imaging optical system or the imaging element in a case where the reset determination unit determines to reset the position of the imaging optical system or the imaging element, and electronically correcting a change of a position of a subject, based on an operation of the reset by the optical correction unit in the image data in a case where the data indicating the timing when the reset by the optical correction unit is started indicates the start of the reset in the input image data.

In the present invention, the expression of "data indicating the timing when the reset is started" may be data of a graph obtained based on the determination result of the reset determination unit, or may be data of a graph obtained in a case where the optical correction unit starts the reset. For example, the data indicating the timing when the reset using the optical correction unit is started may be data obtained from a difference between a movement amount obtained from the Gyro-sensor and a movement amount through image analysis. For example, in a case where a value indicating that the optical correction lens is rotated to the right by 5 degrees is obtained by the Gyro-sensor and a value indicating that the optical correction lens is rotated to the right by 6 degrees is obtained through the image analysis, it may be determined that the imaging optical system is moved, that is, the reset is started from the fact that the optical correction system is more excessively rotated by 1 degree in the result of the image analysis than in the result of the information of the Gyro-sensor.

In accordance with the imaging device and the operation method according to the present invention, the camera shake detection unit detects the camera shake and the optical correction unit optically corrects the detected camera shake in a case where the optical correction unit is turned on, and the reset determination unit determines whether or not to reset a position of the imaging optical system or the imaging element. The optical correction unit stops the correction and starts the reset of the position of the imaging optical system or the imaging element and the electronic correction unit electronically corrects the change of the position of the subject, based on an operation of the reset by the optical correction unit in the image captured by the imaging unit in a case where the reset determination unit determines to reset the position of the imaging optical system or the imaging element. Accordingly, it is possible to relax the shake of the image caused by the reset operation using the optical correction unit, that is, the change of the position of the subject on the video which is not intended by the user.

In accordance with the image processing device and the image processing method according to the present invention, the input unit configured to input image data of the video captured in the imaging device and data indicating a timing when a reset by the optical correction unit is started is provided. The imaging device includes the imaging optical system that includes one or more lens, the imaging unit having an imaging element, for capturing a video by imaging a subject image through the imaging optical system, a camera shake detection unit configured to detect camera shake, the optical correction unit configured to optically correct the camera shake detected by the camera shake detection unit in a case where the optical correction unit is turned on by changing a position of the imaging optical system or the imaging element, and to stop the correction in a case where the optical correction unit is turned off, and a reset determination unit configured to determine whether or not to reset the position of the imaging optical system or the imaging element. The optical correction unit resets the position of the imaging optical system or the imaging element in a case where the reset determination unit determines to reset the position of the imaging optical system or the imaging element. The electronic correction unit electronically corrects the change of the position of the subject, based on the operation of the reset by the optical correction unit on the image data in a case where the data indicating the timing when the reset by the optical correction unit is started indicates the start of the reset in the image data input by the input unit. Accordingly, it is possible to relax the shake of the image caused by the reset operation using the optical correction unit, that is, the change of the position of the subject on the video which is not intended by the user in a case where the imaging is performed in real time but in a case where the image data is reproduced or recorded later.

BRIEF DESCRIPTION OF THE DRAWINGS

FIG. 5 is a diagram for describing a correction range of an optical correction system.

FIG. 6 is a diagram for describing optical correction at the time of panning.

DETAILED DESCRIPTION

Hereinafter, embodiments of the present invention will be described with reference to the drawings. Although it will be described in the following embodiments that a digital camera is used as an imaging device according to a first embodiment of the present invention, an application scope of the present invention is not limited thereto. For example, the present invention may be applied to electronic devices which includes optical correction means and has an imaging function, such as a digital video camera, a portable phone with a camera, a media player, and a portable information terminal (Personal Data Assistant (PDA)) with a camera such as a tablet terminal or a smartphone.

Figure 1:
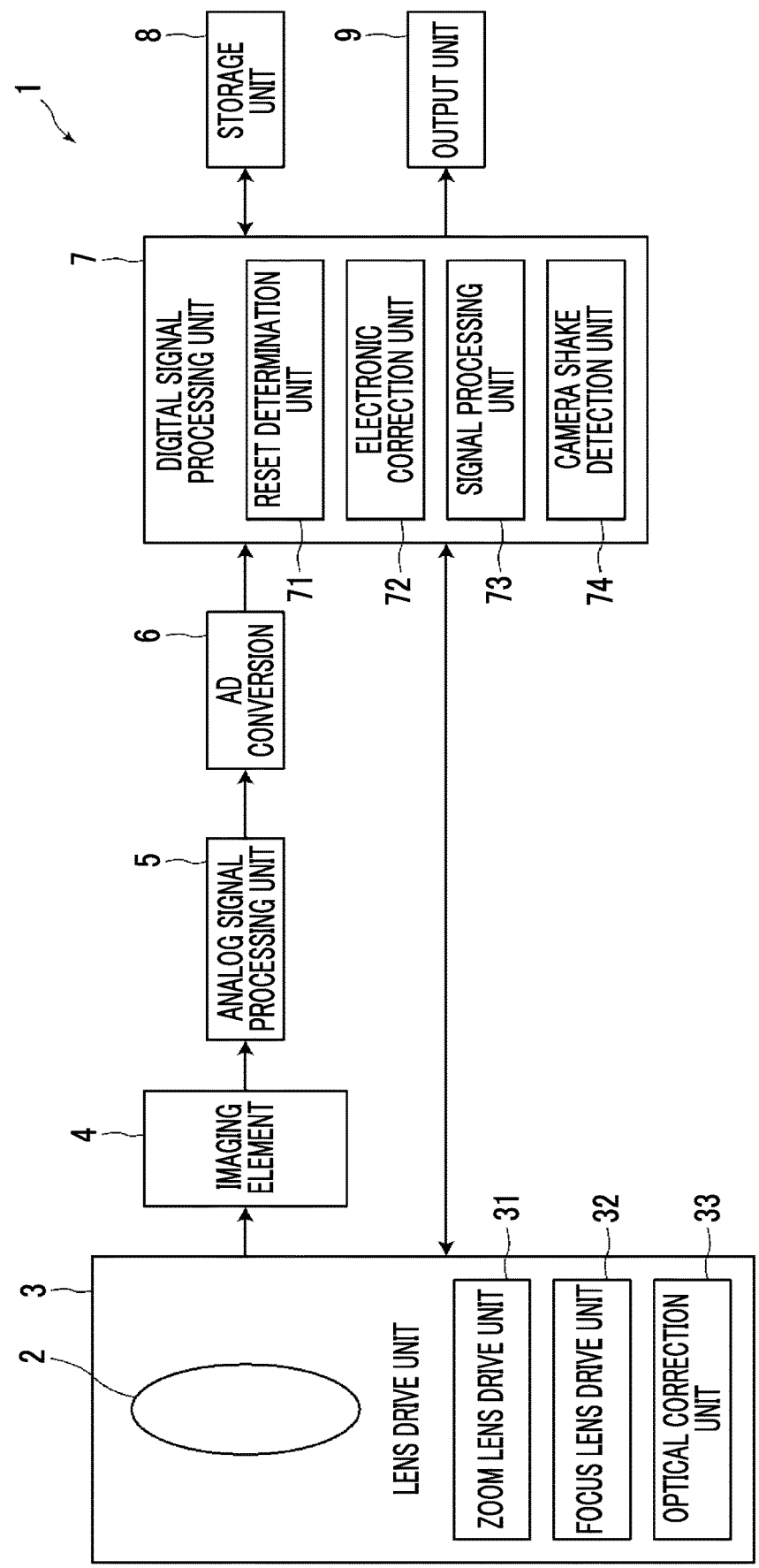
FIG. 1 is a block diagram of a digital camera 1 according to a first embodiment of the present invention.
Figure 2:
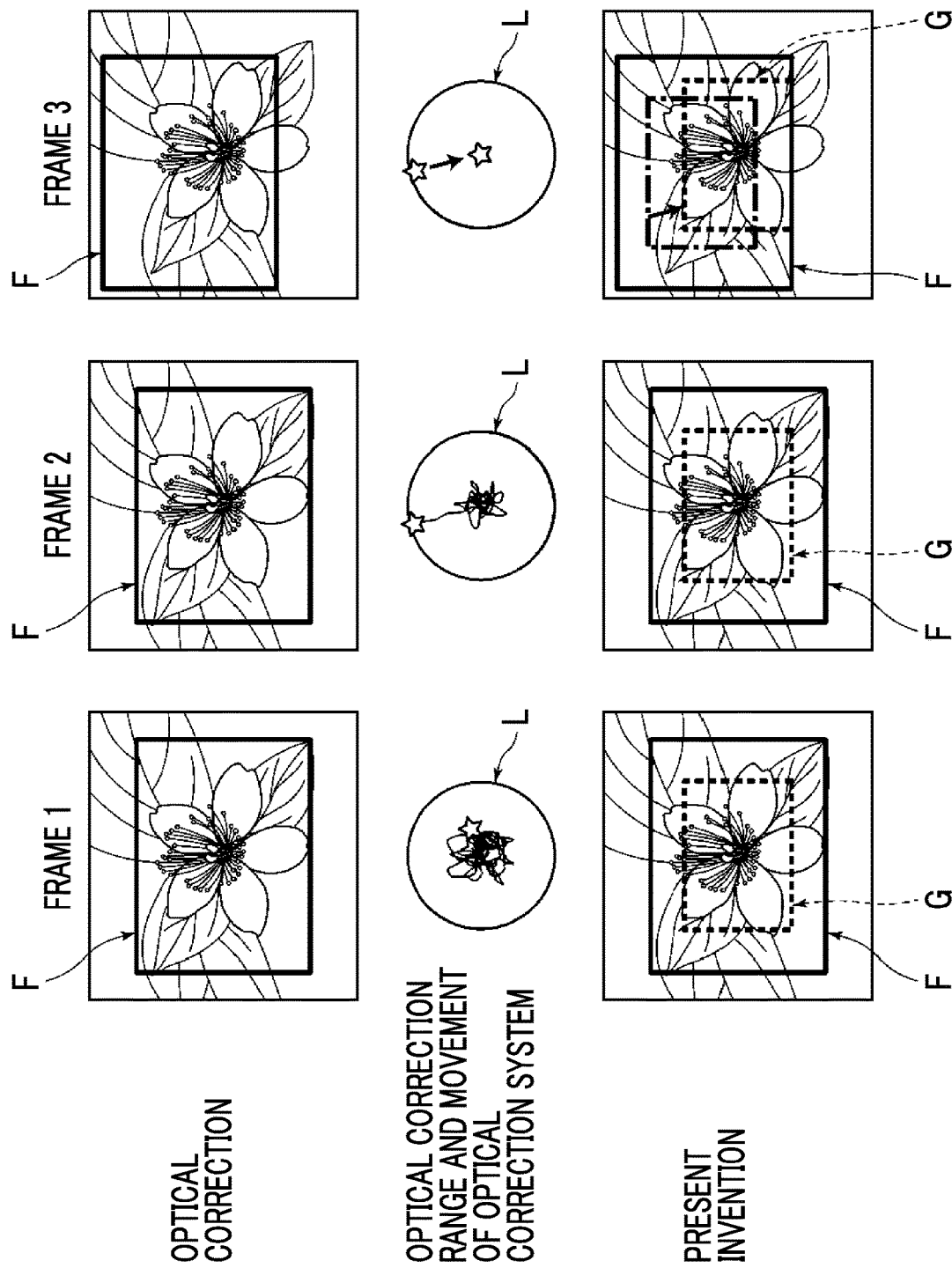
FIG. 2 is a diagram showing an example of movement of an optical correction lens and a change of an angle of view with the movement of the optical correction lens during imaging in a state in which camera shake correction is performed.

FIG. 1 is a block diagram showing a functional configuration of a digital camera 1, and FIG. 2 shows movement of an optical correction system and a change of an angle of view with the movement of the optical correction system during imaging in a state in which camera shake correction is performed. In FIG. 2, frames 1 to 3 are frames in the order in which the frames are captured, and a flow of a video is shown. A thick frame in each frame represents an angle of view F in which the imaging is performed in a state in which optical camera shake correction is performed, a circle L in the center of FIG. 2 represents an optical correction range of the optical correction system, that is, a correctable range, a trajectory within the circle L represents a trajectory of the camera shake, and a star in FIG. 2 represents a current position of the optical correction system. A dotted-line frame in the lower row of FIG. 2 represents a segmentation angle of view G narrowed so as to have a predetermined size by cutting a region having the number of preset pixels from the angle of view F by an electronic correction unit 72 to be described below.

As shown in FIG. 1, the digital camera 1 according to the present embodiment includes an imaging optical system 2 including one or more imaging lenses, a lens drive unit 3 that drives various lenses of the imaging optical system 2, an imaging element 4 that receives a subject image passed through the imaging optical system 2, an analog signal processing unit 5 that performs various analog signal processing such as processing for amplifying output signals from the imaging element 4, an analog to digital (A/D) conversion unit 6 that converts an analog image signal on which signal processing is performed by the analog signal processing unit 5 into digital image data, a digital signal processing unit 7 that performs various signal processing on digital image data on which the A/D conversion is performed by the A/D conversion unit 6, a storage unit 8 that stores information obtained by performing various digital signal processing, and an output unit 9 that outputs an image on which the digital signal processing is performed to the storage unit 8 or a display unit (not shown).

The imaging optical system 2 forms the subject image on a predetermined image forming surface (the imaging element 4 provided within a camera main body), and a focus lens, a zoom lens, and an optical correction lens constituting the imaging optical system 2 are provided. These lenses are step-driven by a lens drive unit 3 that includes a zoom lens drive unit 31, a focus lens drive unit 32, and an optical correction unit 33 which each include a motor and a motor driver. The zoom lens drive unit 31 step-drives the zoom lens in an optical axis direction based on operation amount data of an operation unit such as zoom/up and down arrow buttons (not shown) provided on the digital camera 1. The focus lens drive unit 32 step-drives the focus lens in the optical axis direction based on focus driving amount data output from a signal processing unit 73 including an AF processing unit (not shown).

The optical correction unit (optical correction means) 33 moves the optical correction lens in a direction perpendicular to an optical axis, and performs the camera shake correction by moving the optical correction lens in an orientation in which the camera shake is resolved based on moving amount data calculated by the electronic correction unit 72 to be described below in a case where the camera shake (angle shake or shift shake) is caused by the digital camera 1. Accordingly, the camera shake is optically reduced by suppressing the movement of light reaching the imaging element 4.

The optical correction unit 33 according to the present embodiment performs the camera shake correction in a case where a user operates the operation unit (not shown) provided on the digital camera 1 and thus a camera shake correction mode is turned on, and stops the camera shake correction in a case where the camera shake correction mode is turned off. The optical correction unit 33 moves the optical correction lens to a normal centering position, that is, a central position matching the optical axis in a case where the camera shake correction mode is turned off in response to a determination result of a reset determination unit 71 to be described below, that is, in a case where it is determined that the optical correction lens is reset. Hereinafter, a reset operation for moving the optical correction lens to the central position is simply referred to as reset.

Although it has been described that the optical correction unit 33 according to the present embodiment moves the optical correction lens in the direction perpendicular to the optical axis, the present invention is not limited thereto. The optical correction unit may move the imaging element 4 in the direction perpendicular to the optical axis. Although it has been described in the present embodiment that the camera shake correction mode is turned on or off by the user, the present invention is not limited thereto. The present invention may be appropriately changed in such a manner that the camera shake correction mode is automatically turned on in a case where the camera shake is detected by a camera shake detection unit 74 to be described below and is automatically turned off in a case where a predetermined time elapses while the camera shake is not detected by the camera shake detection unit 74.

For example, the imaging element 4 is a charge-coupled device (CCD) type imaging element, is disposed such that an imaging surface thereof faces the imaging optical system 2, and images a subject through the imaging optical system 2. A plurality of pixels is provided on the imaging surface in a predetermined array. An image of the subject is captured by photoelectrically converting light incident from the subject for each pixel, and imaging signals are output.

The analog signal processing unit 5 includes a sampling two correlation pile circuit that performs noise removing of the analog image signals and an autogain controller that performs gain adjustment of the analog image signals. Thus, the analog signal processing unit removes noise of the analog image signals output as the imaging signals from the imaging element 4, and amplifies the analog image signals. The A/D conversion unit 6 converts the analog image signals into digital image data. Hereinafter, the digital image data is simply referred to as image data. In the present embodiment, the imaging element 4, the analog signal processing unit 5, and the A/D conversion unit 6 function as imaging means for obtaining the image data.

The digital signal processing unit 7 includes the reset determination unit (reset determination means) 71, the electronic correction unit (electronic correction means) 72, the signal processing unit 73, and the camera shake detection unit (camera shake detection means) 74.

The reset determination unit 71 determines whether or not to reset a position of the optical correction lens. In the present embodiment, in a case where a position (a position represented by a star) of the optical correction lens moved by the optical correction unit 33 is positioned in an edge of an optical correction range which is a correctable range of the optical correction lens as shown in the center at the middle row of FIG. 2, since correction in a direction toward to the edge from the center is not able to be performed, the reset determination unit determines to perform the reset by deeming the optical correction lens to reach a correction limit. In a case where the reset determination unit 71 determines to perform the reset, the optical correction unit 33 starts the reset, and moves the optical correction lens to the central position as shown in the right side in the middle row of FIG. 2.

The electronic correction unit 72 electronically corrects a change of a position of a subject based on the reset operation using the optical correction unit 33 on a captured image in a case where the reset using the optical correction unit 33 is started. As shown in the lower row of FIG. 2, the electronic correction unit performs electronic correction by generating the segmentation angle of view G narrowed so as to have a predetermined size by cutting the region having the number of preset pixels from the angle of view F during the imaging and adjusting the segmentation position of the segmentation angle of view G on the image in at least one direction of a horizontal direction or a vertical direction based on the change of the position of the subject based on the reset operation. The size of the segmentation angle of view G may be a size set in advance to the digital camera 1, or may be a size set by the user so as to be changeable. In the present embodiment, it is assumed that the segmentation angle of view G of 3686×1944 pixels is cut from the angle of view F of 4096×2160 pixels. That is, it is assumed that the segmentation angle of view G has a value which is about 90% of the angle of view F in the vertical and horizontal directions.

For example, in a state in which the camera shake correction is performed by the optical correction unit 33 while the subject being stopped is captured by the digital camera 1 as shown in FIG. 2, the camera shake corrected by the optical correction unit 33 falls within the optical correction range on the frame 1, the center of the segmentation angle of view G matches the center of the angle of view F as shown in FIG. 2. In the present embodiment, the image data displayed in the segmentation angle of view G is output to the output unit 9, and is displayed on, for example, a display unit (not shown).

Subsequently, since the camera shake falls within the optical correction range on the frame 2, the angle of view F and the segmentation angle of view G are positioned in the same positions as those on the frame 1. However, since the optical correction lens is positioned at the edge of the optical correction range on the frame 2, the reset determination unit 71 determines to perform the reset by deeming the optical correction lens to reach the correction limit, and the optical correction unit starts the reset operation of the optical correction lens. In a case where the reset operation of the optical correction lens is started, since the position of the optical correction lens is rendered to be forcibly returned to the center, the optical correction lens moves in a direction which is not related to the camera shake, and thus, the angle of view F is changed from the position of the angle of view F of the frame 2 as represented on the frame 3. The change of the position of the subject which is not intended by the user, that is, image shake is caused due to the change of the angle of view F on the video in some cases.

In the present embodiment, the electronic correction unit 72 performs the electronic correction by calculating a change amount of the angle of view F from a return amount with which the optical correction lens is moved to the center through the reset operation and adjusting the segmentation position of the segmentation angle of view G in a direction in which the change amount is canceled which is a direction opposite to the direction in which the angle of view F is changed, that is, a direction in which the change of the position of the subject on the image is canceled by the calculated change amount. The electronic correction amount using the electronic correction unit 72 is determined by converting the return amount of the optical correction lens into the number of pixels on the image in advance, storing the number of pixels in the storage unit 8, and reading the number of pixels based on the detected return amount of the correction lens. It is assumed that the return amount of the optical correction lens is calculated from a value output to the optical correction unit 33 by the camera shake detection unit 74. As the electronic correction amount, a value calculated from a difference between the value output to the optical correction unit 33 by the camera shake detection unit 74 and the movement amount of the subject obtained through image analysis or a value obtained by performing gain processing on the movement amount of the subject obtained through the image analysis may be used.

As stated above, the electronic correction unit 72 performs the electronic correction, and thus, the segmentation position of the segmentation angle of view G is adjusted in a direction of an arrow in FIG. 2 as shown in the right side in the lower row of FIG. 2. Accordingly, it is possible to position the segmentation angle of view G on the frame 3 in the same position as that on the frame 2, and thus, it is possible to relax the shake of the image caused by the reset operation using the optical correction unit 33, that is, the change of the position of the subject on the video which is not intended by the user.

After the electronic correction is performed by the electronic correction unit 72, that is, after the optical correction lens is returned to the center on the frame 3 of FIG. 2, the optical correction is immediately restarted by the optical correction unit 33 while the segmentation angle of view G is fixed in the position obtained by adjusting the segmentation position shown on the frame 3, that is, the segmentation angle of view G is fixed in the position obtained by performing the electronic correction. It has been described in the present embodiment that the optical correction is restarted while the position of the segmentation angle of view G is fixed. In a case where the position of the segmentation angle of view G is fixed, even though the segmentation position is rendered to be adjusted in the same direction as that in the current reset operation at the time of the next reset operation, since there is no region in which the position of the segmentation angle of view G is adjusted in the angle of view F as shown on the right side in the lower row of FIG. 2, the electronic correction is not able to be performed.

Figure 3:
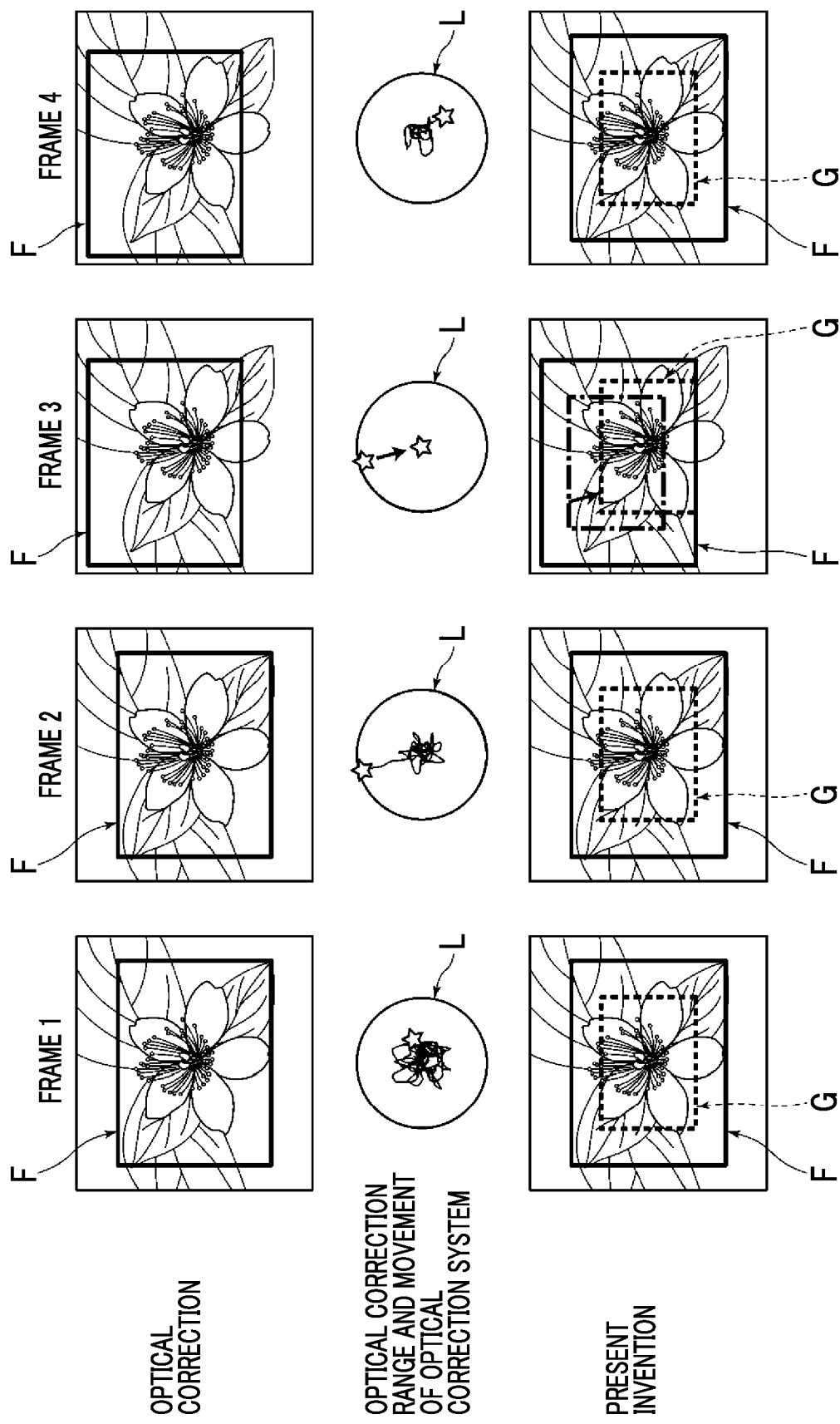
FIG. 3 is a diagram showing another example of the movement of the optical correction lens and the change of the angle of view with the movement of the optical correction lens during imaging in a state in which the camera shake correction is performed.

Another correction method using the electronic correction unit 72 will be described below. Here, FIG. 3 shows another example showing the movement of the optical correction lens and the change of the angle of view with the movement of the optical correction lens during the imaging in a state in which the camera shake correction is performed. Since frames 1 to 3 of FIG. 3 represent the same states as the frames 1 to 3 of FIG. 2, the detailed description will be omitted, and thus, only a frame 4 will be described.

In the present embodiment, in order to prevent the electronic correction from being unperformed due to the reason that there is no region in which the position of the segmentation angle of view G is adjusted in the angle of view F as shown in the frame 3 of the lower row of FIG. 3, the optical correction is not immediately restarted by the optical correction unit 33 after the electronic correction is performed by the electronic correction unit 72, that is, after the optical correction lens is returned to the center in the frame 3 of FIG. 2, and the camera shake correction for correcting the camera shake is performed by the electronic correction unit 72 for a predetermined time. As a result, the electronic correction is switched to the optical correction of the optical correction unit 33 in a timing when the center of the segmentation angle of view G reaches the vicinity of the center of the angle of view F. The timing when the center of the segmentation angle of view G reaches the vicinity of the center of the angle of view F may be a timing when the center of the segmentation angle of view G is positioned within a predetermined region including the center of the angle of view F. The region may be appropriately changed depending on the performance of the digital camera 1.

By doing this, the switching from the electronic correction to the optical correction is performed, and thus, the center of the segmentation angle of view G is positioned in the vicinity of the center of the angle of view F as shown on the frame 4 on the lower row of FIG. 3. Accordingly, the correction is returned to the frame 1, and the correction performed for the frames 1 to 4 can be repeatedly performed from the frame 1.

The signal processing unit 73 functions as an image quality correction processing circuit that performs signal processing such as gradation correction processing or gamma-correction processing on the input image data or a compression/decompression processing circuit for compressing/decompressing on the image data on which the processing such as the image quality correction is performed in a predetermined format such as Joint Photographic Experts Group (JPEG) in the case of a still image or Moving Photographic Experts Group (MPEG) in the case of a video. The signal processing unit functions as an AF processing unit that performs AE processing by detecting a focus position based on the image data, determining a focusing set value (focus driving amount), and outputting focus driving amount data. The signal processing unit functions as an AE processing unit that performs AE processing by measuring a subject brightness (photometric value) based on the image data, determining exposure set values such as an F number, a shutter speed, and an exposure time based on the measured subject brightness, and outputting F number data and shutter speed data. The signal processing unit functions as an AWB processing unit that performs AWB processing for automatically adjusting white balance at the time of imaging.

The camera shake detection unit 74 detects the vibration of the main body of the digital camera 1 caused by the camera shake of the user, and may be constituted by a Gyro-sensor or an acceleration sensor. The detected vibration is converted into an electric signal, and is output as the camera shake amount to the optical correction unit 33.

The storage unit 8 includes a volatile memory such as a dynamic random access memory (DRAM) and a nonvolatile memory such as a flash memory which stores various information items used by the digital signal processing unit 7 and images on which various digital signal processing is performed as needed. Although it has been described in the present embodiment that the storage unit 8 is provided separately from the digital signal processing unit 7, the present invention is not limited thereto. The storage unit 8 may be provided in the digital signal processing unit 7.

The output unit 9 outputs an image on which various digital signal processing is performed to the storage unit 8 or a display unit (not shown), or a storage unit outside the device in a wireless or wired communication manner.

The respective units of the main body of the digital camera 1 are controlled by a CPU (not shown) in response to an operation using the operation unit or signals from the functional blocks.

Figure 4:
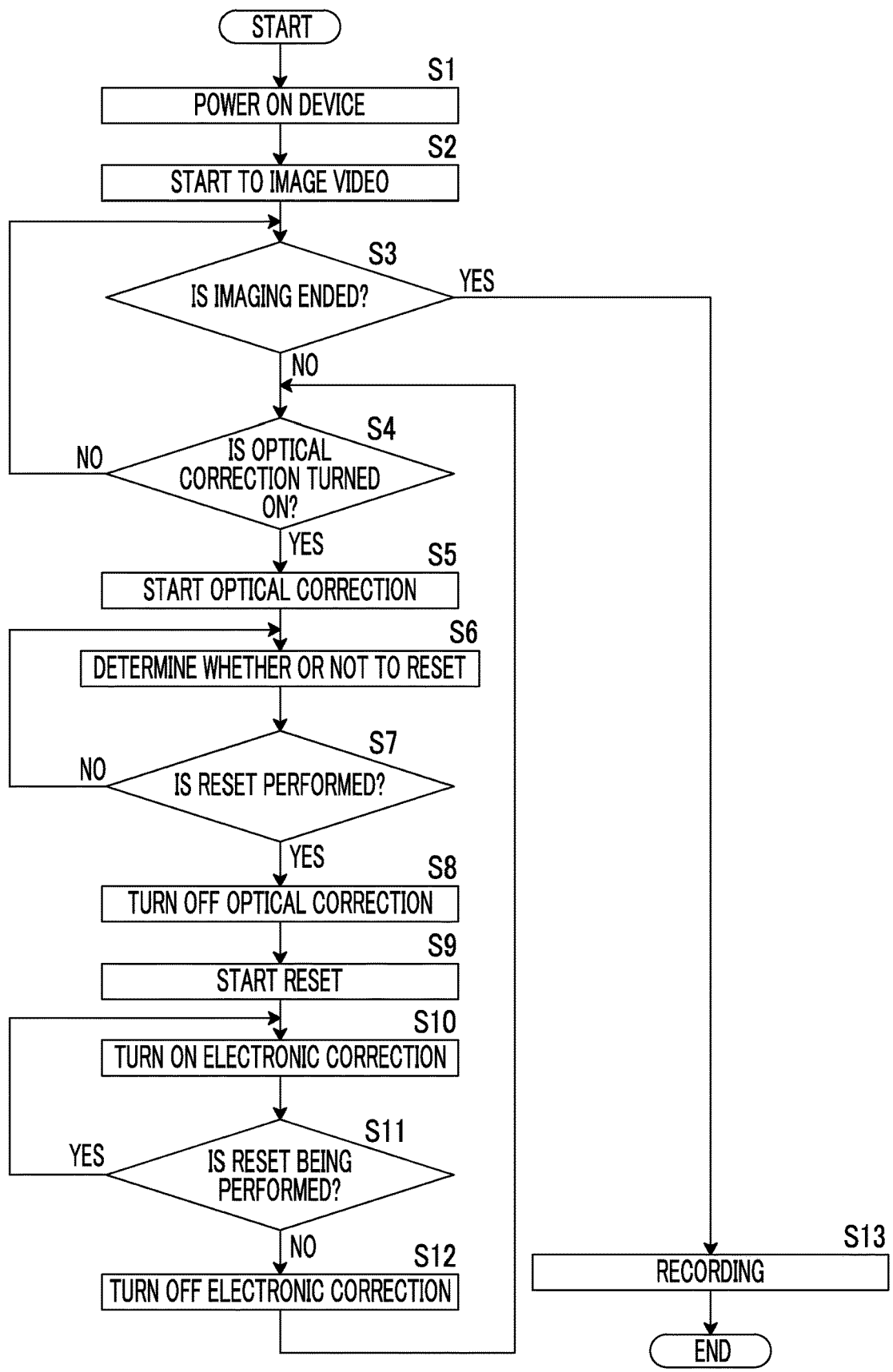
FIG. 4 is a flowchart for describing a flow of the imaging of the digital camera of FIG. 1.

An operation method of the digital camera 1 having the aforementioned configuration will be described in detail with reference to the drawings. Here, FIG. 4 shows a flowchart for describing a flow of the imaging of the digital camera 1.

Initially, in a case where the digital camera 1 is powered on (step S1), the digital camera 1 starts to capture the video (step S2). The digital camera 1 determines whether or not the imaging is ended (step S3), and determines that the imaging is ended in a case where the imaging is ended by the operation of the user (step S3; YES). The digital camera 1 stores the captured video in the storage unit 8 (step S13), and ends a series of imaging processes.

Meanwhile, the digital camera determines whether or not the camera shake correction is turned on, that is, whether or not the optical correction of the optical correction unit 33 is turned on (step S4) in a case where the imaging is not ended (step S3; NO) and proceeds to the processing of step S3 and repeatedly performs the subsequent processing in a case where the optical correction is not turned on (step S4; NO). In a case where the optical correction is turned on (step S4; YES), the optical correction of the optical correction unit 33 is started (step S5).

In a case where the optical correction of the optical correction unit 33 is started (step S5), the determination of whether or not to perform the reset is started by the reset determination unit 71 (step S6). In a case where the reset determination unit determines not to perform the reset (step S7; NO), the digital camera proceeds to the processing of step S6, and repeatedly performs the subsequent processing. In a case where the reset determination unit determines to perform the reset (step S7; YES), the optical correction using the optical correction unit 33 is turned off (step S8), and the reset operation of the optical correction lens is started by the optical correction unit 33 (step S9).

Subsequently, the electronic correction unit 72 performs the electronic correction by turning on the electronic correction (step S10). The reset determination unit 71 determines whether or not the reset is performed by continuously performing the reset determination while the electronic correction of the electronic correction unit 72 is performed. In a case where the reset is performed (step S11; YES), the digital camera proceeds to the processing of step S10, and the electronic correction unit 72 subsequently performs the electronic correction. In a case where the reset is not performed, that is, the reset is completed (step S11; NO), the electronic correction unit 72 ends the electronic correction (step S12). The digital camera proceeds to the processing of step S4, and repeatedly performs the subsequent processing.

Although it has been described in the present embodiment that the processing of steps S8 to S10 is performed in this order, the present invention is not limited thereto. In a case where the reset determination unit determines to perform the reset in step S7 (step S7; YES), the electronic correction unit 72 may perform the electronic correction by turning on the electronic correction (step S10). Thereafter, the optical correction using the optical correction unit 33 may be turned off (step S8), and may start the reset operation of the optical correction lens by the optical correction unit 33 (step S9). For example, in a case where the imaging is ended by the operation of the user like a case where the imaging mode provided in the digital camera 1 is turned off by the user during the series of processing, the digital camera 1 determines that the imaging is ended, and proceeds to the processing of step S13. Thereafter, the digital camera stores the captured video in the storage unit 8 (step S13), and ends the series of imaging processes.

The digital camera 1 is operated as stated above, and thus, the optical correction unit 33 stops the correction and starts the reset and the electronic correction unit 72 electronically corrects the change of the position of the subject on the image based on the reset operation in a case where the reset determination unit 71 determines to reset the position of the optical correction lens. Accordingly, it is possible to relax the shake of the image caused by the reset operation using the optical correction unit 33, that is, the change of the position of the subject on the video which is not intended by the user.

Although it has been described in the present embodiment that the reset determination of the reset determination unit 71 is the determination to perform the reset by deeming the optical correction lens to reach the correction limit in a case where the position of the optical correction lens moved by the optical correction unit 33 is positioned at the edge of the optical correction range which is the correctable range of the optical correction lens, the present invention is not limited thereto. FIG. 5 is a diagram for describing the correction range of the optical correction lens.

As shown in FIG. 5, in a case where an edge region M constituted by a predetermined region toward the from a circumference to a center is set within an optical correction range L, that is, a correctable range and the optical correction lens is positioned in the edge region M for a predetermined preset time or longer, since there is a concern that the correction is not able to be sufficiently performed in the vicinity of the edge of the optical correction range L, the reset determination unit may determine to perform the reset by dimming the optical correction lens to reach the correction limit. The edge region M may be set so as to be changeable by the user.

Figure 7:
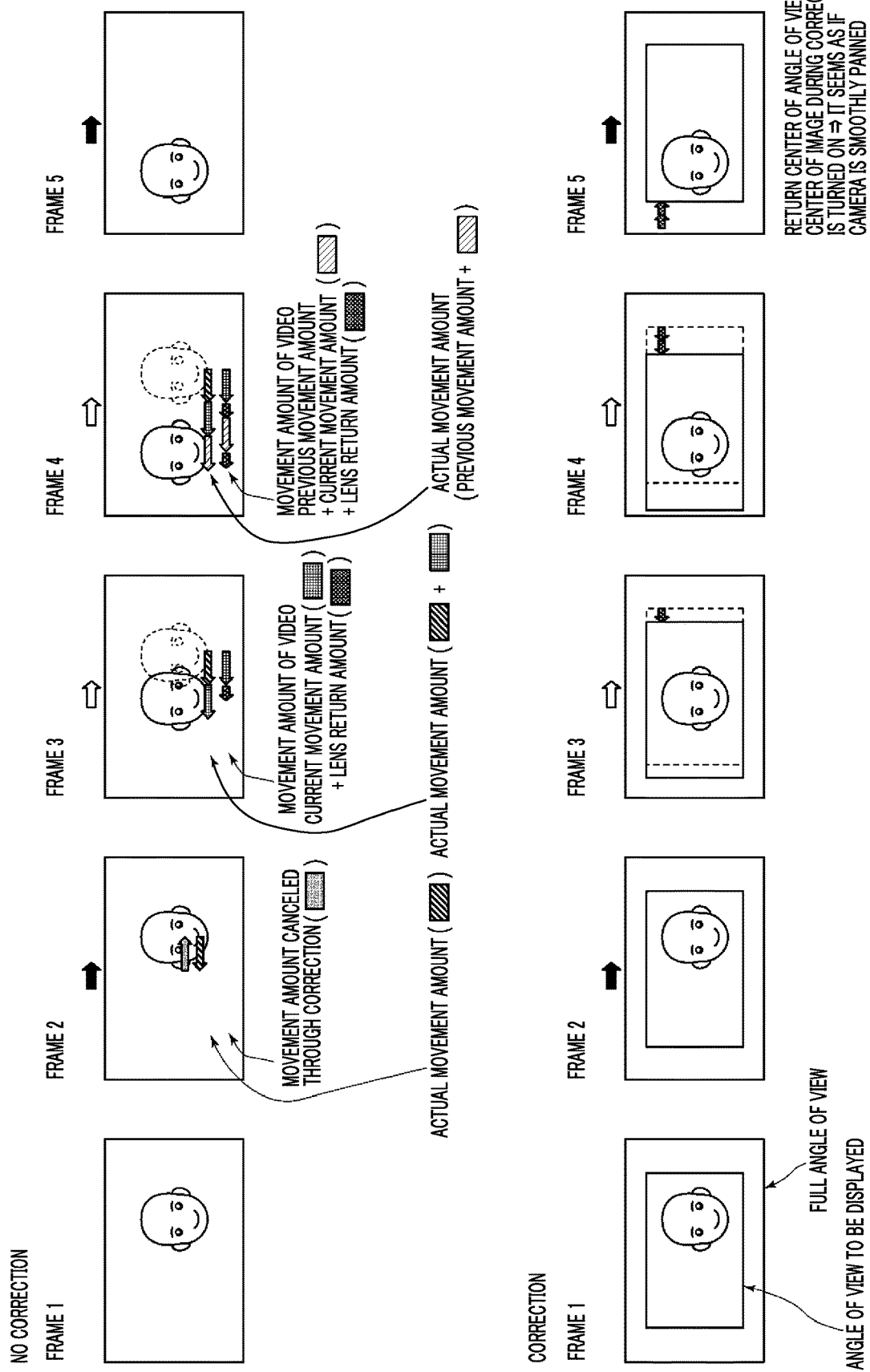
FIG. 7 is a diagram showing an example of a reset operation of the optical correction system and the change of the angle of view at the time of panning.
Figure 8:
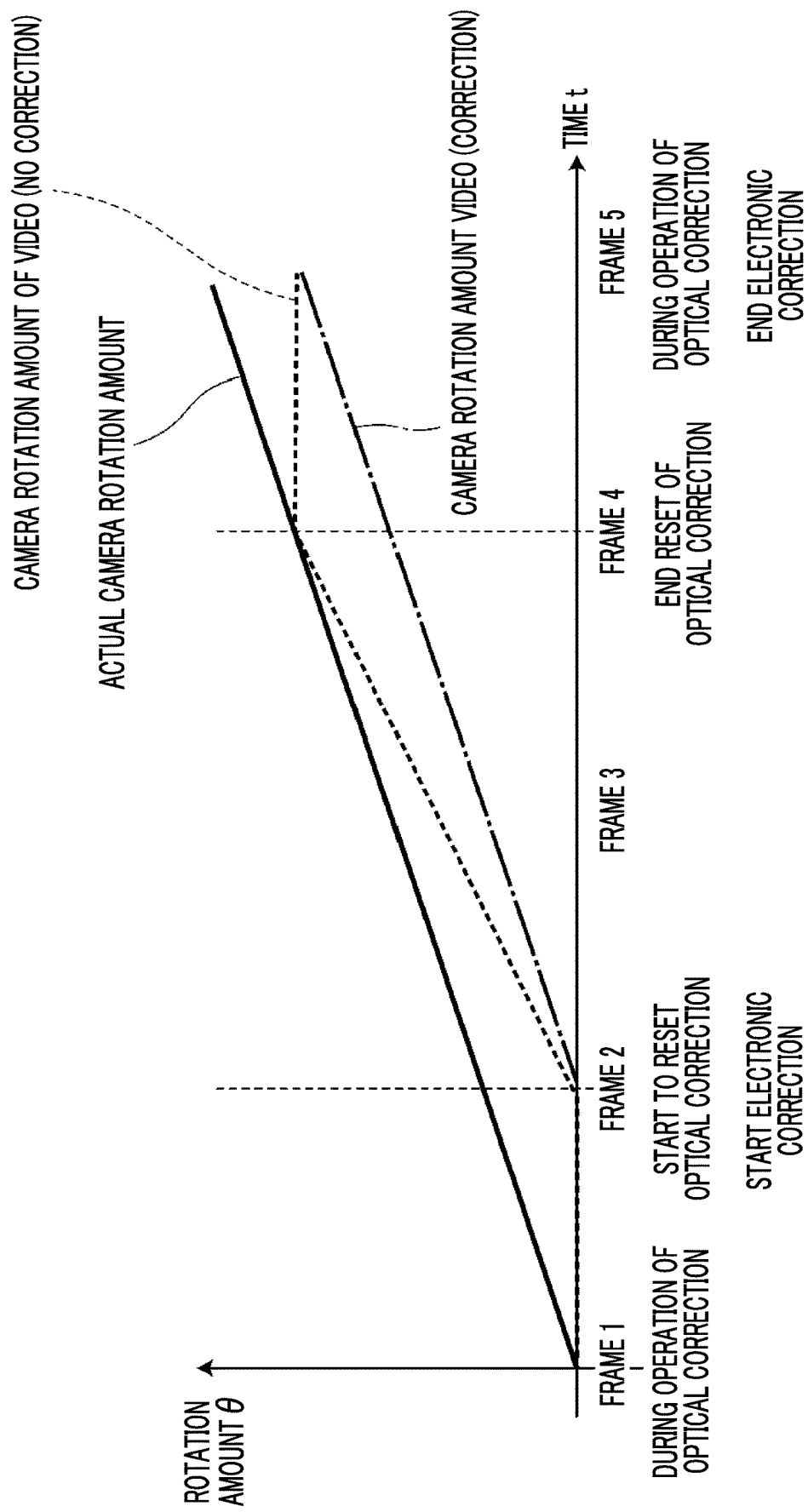
FIG. 8 is a graph showing a relationship between the reset operation of the optical correction system and a rotation amount of the camera at the time of panning.

In a state in which the optical correction is turned on by the optical correction unit 33, the reset determination unit may determine whether or not the panning is started, and may determine to perform the reset in a case where the panning is started. Hereinafter, the correction at the time of panning will be described. FIG. 6 is a diagram for describing the optical correction at the time of panning, FIG. 7 is a diagram showing an example of a reset operation of an optical correction system and the change of the angle of view at the time of panning, and FIG. 8 is a graph showing a relationship between the reset operation of the optical correction system and a rotation amount of the camera at the time of the panning.

As one of techniques for capturing the video, there is panning. The panning means a method of capturing the video while moving the orientation of the digital camera 1 in a left-right direction or an upper-lower direction, and includes imaging such as follow-through for capturing the video while tracking the subject. In the aforementioned digital camera 1, in a case where the panning is performed, the imaging is performed while intentionally moving the digital camera 1 greatly. Thus, in a case where the camera shake amount, that is, the magnitude or speed of the vibration detected by the camera shake detection unit 74, the state of the optical correction may be changed such that the optical correction enters an on state (a black arrow of FIG. 6) or the optical correction enters an off state (a white arrow of FIG. 6) as shown in FIG. 6 depending on the shake width of the camera shake has a value with which the correction is not able to be performed even though the optical correction lens is moved to the edge of the optical correction range.

As the aforementioned embodiment, in a case where a control is performed such that the position of the optical correction lens is reset in a timing when the optical correction enters the off state and the reset operation of the optical correction lens is started, since the position of the optical correction lens is rendered to be forcibly returned to the center, the optical correction lens is moved in a direction which is not related to the camera shake. Thus, the change of the position of the subject which is not intended by the user on the video, that is, the shake of the image is caused by changing the state of the optical correction from the on state to the off state in some cases.

In the present embodiment, the reset determination unit 71 determines whether or not the panning is started in a state in which the optical correction using the optical correction unit 33 is turned on, and determines to perform the reset in a case where the panning is started. For example, the determination of whether or not the panning is started is performed by the operation of the user who operates the operation unit (not shown) provided on the digital camera 1 or on or off signals obtained by turning on or off the panning imaging mode. The determination of whether or not the panning is started is not limited thereto. Similarly to the aforementioned embodiment, in a case where the position of the optical correction lens moved by the optical correction unit 33 is positioned at the edge of the optical correction range which is the correctable range of the optical correction lens, the reset determination unit may determine that the panning for capturing the video while moving the digital camera 1 is started, and may determine to perform the reset. The reset determination unit may determine that the panning for capturing the video while moving the digital camera 1 is started in a case where the optical correction lens is positioned within the edge region of the correctable range using the optical correction unit 33 for a predetermined set time or longer, and may determine that the panning for capturing the video while moving the digital camera 1 is started in a case where an integral value of the value detected by the camera shake detection unit 74 exceeds a set threshold value.

As shown on the upper row of FIG. 7, in a case where only the optical correction using the optical correction unit 33 is performed without performing the electronic correction using the electronic correction unit 72, the panning is started after a frame 1 indicating an initial state. By doing this, since the optical correction is turned on on a frame 2, movement through the panning (actual movement amount in FIG. 7) is corrected by the optical correction using the optical correction unit 33, and the angle of view is not changed from the frame 1. That is, the movement amount canceled through the correction in FIG. 7 is corrected by the optical correction unit 33. Here, the movement amount canceled through the correction and the actual movement amount have the same value.

Subsequently, in a case where the reset determination unit 71 determines to perform the reset, the optical correction using the optical correction unit 33 is turned off, and the reset is started by turning on the optical correction using the optical correction unit 33, the angle of view is changed by an amount obtained by combining a movement amount between the frame 2 and the frame 3, that is, a current movement amount with a return amount of the optical correction lens through the reset. Since the optical correction is also turned off on a frame 4 similarly to the frame 3, the angle of view is changed by an amount obtained by combining a movement amount on the frame 3, that is, a previous movement amount, a movement amount between the frame 3 and the frame 4, that is, a current movement amount, and a return amount of the optical correction lens through the reset.

Subsequently, on a frame 5, the reset determination unit 71 determines not to perform the reset, and the optical correction using the optical correction unit 33 is turned on again. Thus, the movement between the frame 4 and the frame 5, that is, the movement through the panning is corrected through the optical correction using the optical correction unit 33, and the angle of view is not changed from the frame 4. Since the angle of view is not changed or the angle of view is unintentionally changed even though the digital camera 1 continues to move as stated above, it is very difficult to image the image, and the captured image looks unattractive.

In a case where the reset determination unit 71 determines to perform the reset as shown on the lower row of FIG. 7, that is, in a case where the reset operation is started by turning off the optical correction, the correction using the electronic correction unit 72 is started, and the angle of view in a direction in which the return amount of the optical correction lens is canceled, that is, the segmentation angle of view (angle of view to be displayed) is moved as represented on the frame 3 and the frame 4.

Thereafter, in a case where the optical correction using the optical correction unit 33 is turned on again, the segmentation angle of view is moved in a direction opposite to the direction in which the optical correction lens is moved on the frame 3 and the frame 4 for the present as represented on the frame 5. That is, the optical correction lens is moved such that the center of the segmentation angle of view (angle of view to be displayed) is returned to the center of a full angle of view (a center of the image), and thus, the optical correction lens is returned to the initial state indicated by the frame 1. Accordingly, it is possible to repeatedly perform the electronic correction of the frames 1 to 5. As mentioned above, in a case where only the optical correction using the optical correction unit 33 is performed without performing the electronic correction using the electronic correction unit 72 indicated by a dotted line as shown in FIG. 8, since a rotation amount θ of the digital camera 1 is a predetermined rotation amount θ from a point of time of the frame 4, a slope of a graph is changed. However, in a case where the electronic correction using the electronic correction unit 72 according to the present embodiment is performed, the rotation amount of the digital camera 1 θ does not cause a change of the slope of the graph even after the point of time of the frame 4. Accordingly, it is possible to smoothly capture the video on which the panning is performed even though the reset of the optical correction lens is started during the panning.

Figure 9:
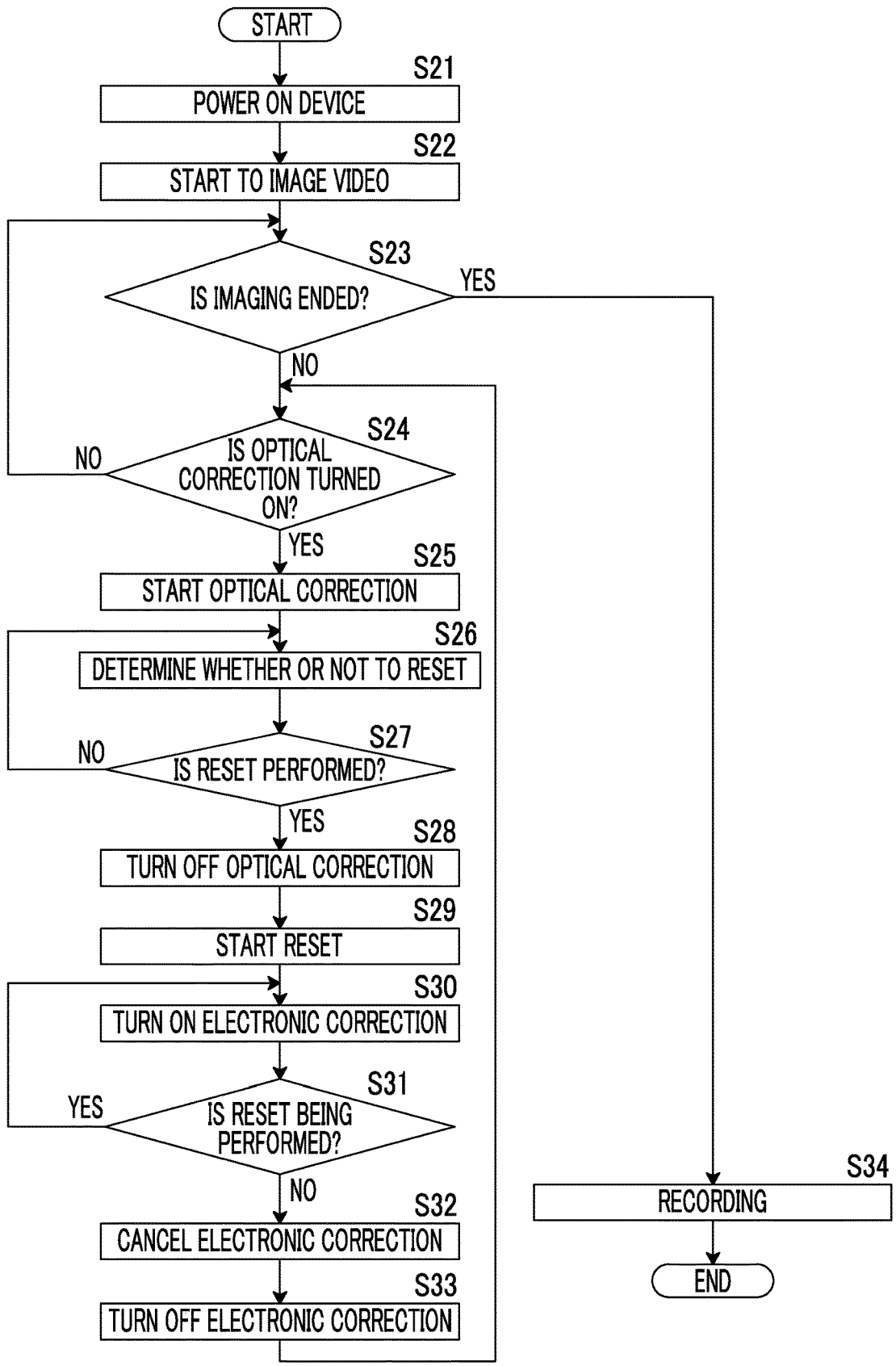
FIG. 9 is a flowchart for describing a flow of the imaging at the time of panning of the digital camera of FIG. 1.

An operation method of the digital camera 1 according to the present embodiment having the aforementioned configuration will be described in detail with reference to the drawings. FIG. 9 shows a flowchart for describing a flow of the imaging of the digital camera 1. FIG. 9 shows a flowchart in which processing for canceling the electronic correction using the electronic correction unit 72 is added after the reset determination using the reset determination unit 71 of step S11 in the processing of steps S1 to S13 of FIG. 4. Thus, the redundant steps will not be described, and only different steps will be described in detail.

As shown in FIG. 9, while the electronic correction is performed by the electronic correction unit 72 (after step S30), the reset determination unit 71 determines whether or not the reset is being performed while continuing to perform the reset determination. In a case where the reset is not being performed, that is, in a case where the reset is completed (step S31; NO), the electronic correction unit 72 cancels the electronic correction (step S32). That is, as described above, processing for returning the frame to the initial state indicated on the frame 1 is performed by moving the segmentation angle of view in the direction opposite to the direction in which the optical correction lens is moved on the frame 3 and the frame 4, that is, moving the angle of view such that the center of the segmentation angle of view (angle of view to be displayed) is returned to the center of the full angle of view (the center of the image), as shown on the frame 5 of FIG. 8. Subsequently, the electronic correction unit 72 ends the electronic correction (step S33). The digital camera proceeds to the processing of step S24, and repeatedly performs the subsequent processing. For example, in the present embodiment, in a case where the imaging is ended by the operation of the user like a case where the imaging mode set to the digital camera 1 is turned off by the user during the series of processing, the digital camera 1 determines that the imaging is ended, and proceeds to the processing of step S34. Thereafter, the digital camera stores the captured video in the storage unit 8 (step S34), and ends the series of imaging processes.

As stated above, the digital camera 1 is operated as stated above, and thus, the optical correction unit 33 stops the correction and starts the reset and the electronic correction unit 72 electronically corrects, that is, cancels the change of the position of the subject on the image based on the reset operation in a case where the reset determination unit 71 determines to reset the position of the optical correction lens. Thereafter, since the digital camera performs the correction for returning the canceled position of the subject to an original position in a case where the optical correction unit 33 is turned on again, it is possible to return the frame to the initial state before the electronic correction is performed, and it is possible to repeatedly perform the electronic correction. Accordingly, it is possible to smoothly capture the video on which the panning is performed even though the reset of the optical correction lens is started during the panning.

Figure 10:
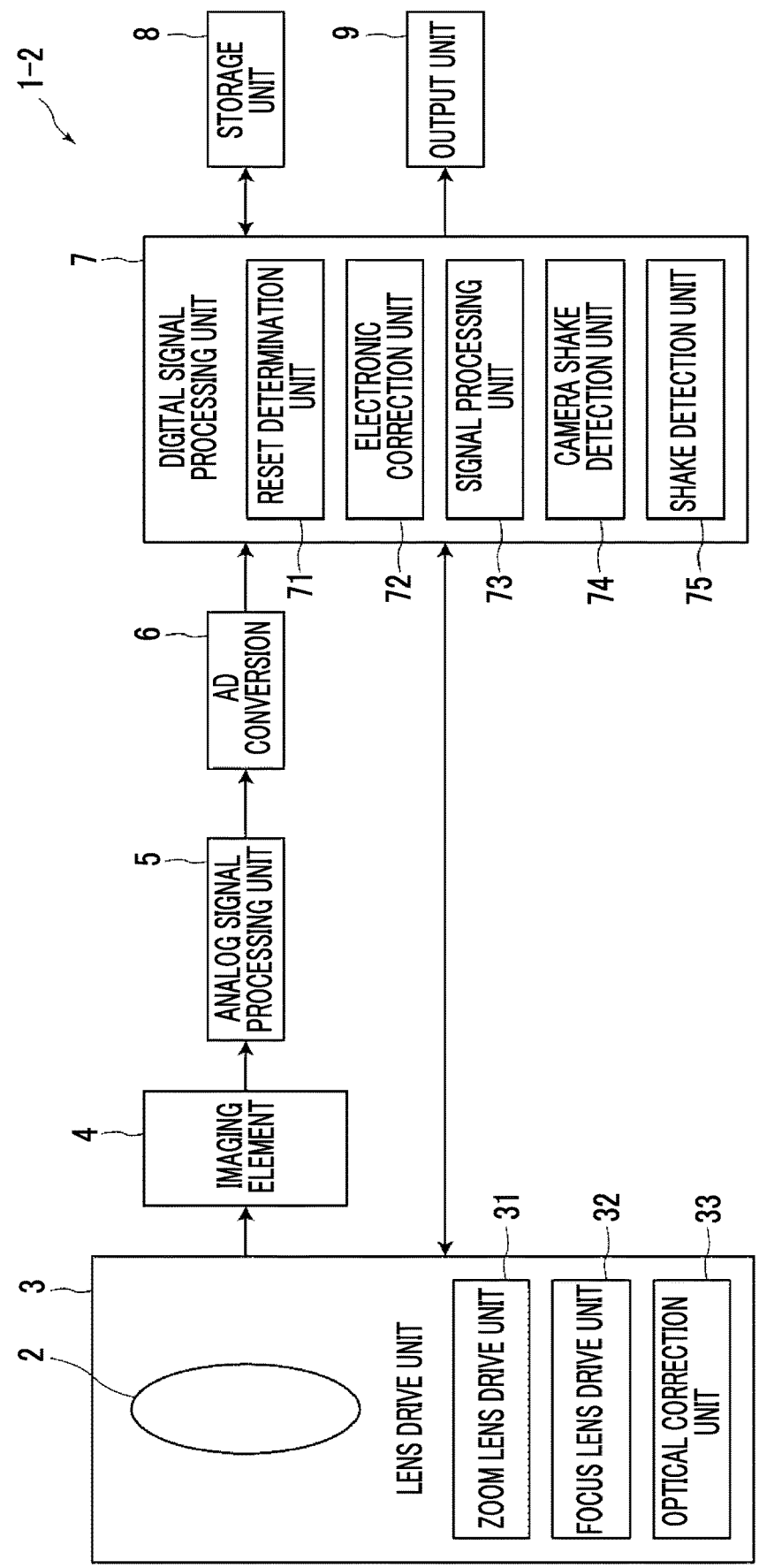
FIG. 10 is a block diagram of a digital camera 1-2 according to a second embodiment of the present invention.

Hereinafter, a digital camera 1-2 according to a second embodiment according to the present invention will be described in detail with reference to the drawings. FIG. 10 is a block diagram of the digital camera 1-2. FIG. 10 shows the configuration in which a shake detection unit 75 is added to the digital signal processing unit 7 of the digital camera 1 according to the aforementioned embodiment shown in FIG. 1. Thus, the redundant portions will not be described, and only different portions will be described in detail.

The shake detection unit 75 detects the vibration of the main body of the digital camera 1-2, and may be constituted by a Gyro-sensor or an acceleration sensor. The detected vibration is converted into the electric signal, and is output to the reset determination unit 71. The Gyro-sensor or the acceleration sensor constituting the shake detection unit 75 may also be used as the Gyro-sensor or the acceleration sensor of the camera shake detection unit 74.

In the digital camera 1-2, the reset determination unit 71 determines to perform the reset in a case where the integral value of the value detected and output by the shake detection unit 75 exceeds the set threshold value. That is, in a case where the magnitude of the vibration of the main body of the digital camera 1-2 detected by the shake detection unit 75 is larger than the set value, the vibration is not corrected, and the reset operation is performed in order to prepare for the next vibration. The integration is started from a point of time when the optical correction unit 33 is turned on, and the value is reset in a timing when the reset is started.

The reset determination unit 71 may determine to perform the reset in a case where a state in which the value detected and output by the shake detection unit 75 is smaller than the set threshold value is continued for a predetermined set time or longer. That is, in a case where the reset determination unit determines that the digital camera 1-2 is stopped, the reset operation is performed in order to prepare for the next vibration.

Similarly to the digital camera 1 according to the aforementioned embodiment, in the digital camera 1-2 having the aforementioned configuration, the digital camera 1-2 is operated, and thus, the optical correction unit 33 stops the correction and starts the reset and the electronic correction unit 72 electronically corrects the change of the position of the subject on the image based on the reset operation in a case where the reset determination unit 71 determines to reset the position of the optical correction lens. Accordingly, it is possible to relax the shake of the image caused by the reset operation using the optical correction unit 33, that is, the change of the position of the subject which is not intended by the user on the video.

The optical correction unit 33 stops the correction and starts the reset and the electronic correction unit 72 electronically corrects, that is, cancels the change of the position of the subject on the image based on the reset operation in a case where the reset determination unit 71 determines to reset the position of the optical correction lens. Thereafter, since the digital camera performs the correction for returning the canceled position of the subject to an original position in a case where the optical correction unit 33 is turned on again, it is possible to return the frame to the initial state before the electronic correction is performed, and it is possible to repeatedly perform the electronic correction. It is possible to smoothly capture the video on which the panning is performed even though the reset of the optical correction lens is started during the panning.

In the present invention, the electronic correction unit 72 may function as an image processing device separately from the digital cameras 1 and 1-2 in FIGS. 1 and 10. That is, image data captured by the digital camera 1 or 1-2 that does not include the electronic correction unit 72 and data indicating timing when the reset of the optical correction unit 33 is started are input to the image processing device, and thus, it is possible to electronically correct the change of the position of the subject based on the reset operation by the optical correction unit 33 on the image data in a case where the data indicating the timing when the reset of the optical correction unit 33 is started indicates the start of the reset. Accordingly, it is possible to relax the shake of the image caused by the reset operation using the optical correction unit 33, that is, the change of the position of the subject which is not intended by the user on the video in a case where the imaging is performed in real time but in a case where the image data is reproduced or recorded later.

In the present embodiment, the "data indicating the timing when the reset is started" may be data of a graph obtained based on the determination result of the reset determination unit 71, or may be data of a graph obtained in a case where the optical correction unit 33 starts the reset. For example, the "data indicating the timing when the reset is started" may be data obtained from a difference between a movement amount obtained from the Gyro-sensor and a movement amount through image analysis. For example, in a case where a value indicating that the optical correction lens is rotated to the right by 5 degrees is obtained by the Gyro-sensor and a value indicating that the optical correction lens is rotated to the right by 6 degrees is obtained through the image analysis, it may be determined that the optical correction lens is moved, that is, the reset is started from the fact that the optical correction lens is more excessively rotated by 1 degree in the result of the image analysis than in the result of the information of the Gyro-sensor.

The imaging device according to the present invention is not limited to the embodiments, and may be appropriately changed without departing the gist of the invention.

EXPLANATION OF REFERENCES 1, 1-2: digital camera
2: optical correction lens
3: lens drive unit
31: zoom lens drive unit
32: focus lens drive unit
33: optical correction unit
4: imaging element
5: analog signal processing unit
6: A/D conversion unit
7: digital signal processing unit
71: reset determination unit
72: electronic correction unit
73: signal processing unit
74: camera shake detection unit
75: shake detection unit
8: storage unit
9: output unit

What is claimed is:

1. An imaging device comprising:
an imaging optical system that includes one or more lens;
an imaging unit having an imaging element, for capturing a video by imaging a subject image through the imaging optical system;
a camera shake detection unit configured to detect camera shake;
an optical correction unit configured to optically correct the camera shake detected by the camera shake detection unit in a case where the optical correction unit is turned on by changing a position of the imaging optical system or the imaging element, and to stop the correction in a case where the optical correction unit is turned off; and
a reset determination unit configured to determine whether or not to reset the position of the imaging optical system or the imaging element,
wherein the optical correction unit resets the position of the imaging optical system or the imaging element in a case where the reset determination unit determines to reset the position of the imaging optical system or the imaging element,
wherein the imaging device further comprises an electronic correction unit configured to electronically correct a change of a position of a subject, based on an operation of the reset by the optical correction unit, in an image captured by the imaging unit in a case where the reset by the optical correction unit is started, and
wherein the electronic correction unit performs correction for canceling the change of the position of the subject in the image based on the operation of the reset of the position of the imaging optical system or the imaging element during the operation of the reset by the optical correction unit, and performs correction for returning the canceled position of the subject to an original position in a case where the optical correction unit is turned on again.

2. The imaging device according to claim 1,
wherein the reset determination unit determines to reset the position of the imaging optical system or the imaging element in a case where the imaging optical system or the imaging element reaches a correction limit due to the correction by the optical correction unit.

3. The imaging device according to claim 1,
wherein the reset determination unit determines to reset the position of the imaging optical system or the imaging element in a case where the imaging optical system or the imaging element is positioned within an edge region of a correctable range by the optical correction unit for a predetermined set time or longer.

4. The imaging device according to claim 1,
wherein the reset determination unit determines to reset the position of the imaging optical system or the imaging element in a case where panning is started in a state in which the optical correction unit is turned on.

5. The imaging device according to claim 1, further comprising:
a shake detection unit configured to detect shake of an imaging device main body,
wherein the reset determination unit determines to reset the position of the imaging optical system or the imaging element in a case where an integral value of a value detected by the shake detection unit exceeds a set threshold value.

6. The imaging device according to claim 1, further comprising:
a shake detection unit configured to detect shake of an imaging device main body,
wherein the reset determination unit determines to reset the position of the imaging optical system or the imaging element in a case where a state in which a value detected by the shake detection unit is a value smaller than a set threshold value is continued for a predetermined set time.

7. An operation method of an imaging device which includes an imaging optical system that includes one or more lens, an imaging unit having an imaging element, for capturing a video by imaging a subject image through the imaging optical system, a camera shake detection unit configured to detect camera shake, an optical correction unit configured to optically correct the camera shake by changing a position of the imaging optical system or the imaging element, a reset determination unit configured to determine whether or not to reset the position of the imaging optical system or the imaging element, and an electronic correction unit configured to electronically correct a change of a position of a subject in an image captured by the imaging unit, the method comprising:
causing the camera shake detection unit to detect the camera shake and causing the optical correction unit to optically correct the detected camera shake in a case where the optical correction unit is turned on;
causing the reset determination unit to determine whether or not to reset the position of the imaging optical system or the imaging element; and causing the optical correction unit to stop the correction and start the reset of the position of the imaging optical system or the imaging element in a case where the reset determination unit determines to reset the position of the imaging optical system or the imaging element, causing the electronic correction unit to perform correction for electronically canceling the change of the position of the subject, based on an operation of the reset by the optical correction unit, in the image captured by the imaging unit during the operation of the reset by the optical correction unit, and causing the electronic correction unit to perform correction for returning the canceled position of the subject to an original position in a case where the optical correction unit is turned on again.

8. The operation method according to claim 7,
wherein the reset determination unit determines to reset the position of the imaging optical system or the imaging element in a case where the imaging optical system or the imaging element reaches a correction limit due to the correction by the optical correction unit.

9. The operation method according to claim 7,
wherein the reset determination unit determines to reset the position of the imaging optical system or the imaging element in a case where the imaging optical system or the imaging element is positioned within an edge region of a correctable range by the optical correction unit for a predetermined set time or longer.

10. The operation method according to claim 7,
wherein the reset determination unit determines to reset the position of the imaging optical system or the imaging element in a case where panning is started in a state in which the optical correction unit is turned on.

11. The operation method according to claim 7, wherein:
the imaging device further includes a shake detection unit configured to detect shake of an imaging device main body, and the reset determination unit determines to reset the position of the imaging optical system or the imaging element in a case where an integral value of a value detected by the shake detection unit exceeds a set threshold value.

12. The operation method according to claim 7, wherein:
the imaging device further includes a shake detection unit configured to detect shake of an imaging device main body, and
the reset determination unit determines to reset the position of the imaging optical system or the imaging element in a case where a state in which a value detected by the shake detection unit is a value smaller than a set threshold value is continued for a predetermined set time.

13. An image processing device comprising:
an input unit configured to input image data of a video captured in an imaging device and data indicating a timing when a reset by an optical correction unit is started, the imaging device including an imaging optical system that includes one or more lens, an imaging unit having an imaging element, for capturing a video by imaging a subject image through the imaging optical system, a camera shake detection unit configured to detect camera shake, the optical correction unit configured to optically correct the camera shake detected by the camera shake detection unit in a case where the optical correction unit is turned on by changing a position of the imaging optical system or the imaging element, and to stop the correction in a case where the optical correction unit is turned off, and a reset determination unit configured to determine whether or not to reset the position of the imaging optical system or the imaging element, the optical correction unit resetting the position of the imaging optical system or the imaging element in a case where the reset determination unit determines to reset the position of the imaging optical system or the imaging element; and
an electronic correction unit configured to electronically correct a change of a position of a subject, based on an operation of the reset by the optical correction unit, in the image data in a case where the data indicating the timing when the reset by the optical correction unit is started indicates the start of the reset in the image data input by the input unit.

14. An image processing method comprising:
inputting image data of a video captured in an imaging device and data indicating a timing when a reset by an optical correction unit is started, the imaging device including an imaging optical system that includes one or more lens, an imaging unit having an imaging element, for capturing a video by imaging a subject image through the imaging optical system, a camera shake detection unit configured to detect camera shake, the optical correction unit configured to optically correct the camera shake detected by the camera shake detection unit in a case where the optical correction unit is turned on by changing a position of the imaging optical system or the imaging element, and to stop the correction in a case where the optical correction unit is turned off, and a reset determination unit configured to determine whether or not to reset the position of the imaging optical system or the imaging element, the optical correction unit resetting the position of the imaging optical system or the imaging element in a case where the reset determination unit determines to reset the position of the imaging optical system or the imaging element; and
electronically correcting a change of a position of a subject, based on an operation of the reset by the optical correction unit, in the image data in a case where the data indicating the timing when the reset by the optical correction unit is started indicates the start of the reset in the input image data.

* * * * *